US00RE36516E

United States Patent [19]

Lehrer

[11] E Patent Number: Re. 36,516

[45] Reissued Date of Patent: Jan. 18, 2000

[54] METHOD OF TREATING FLUIDS WITH A FILTER

[75] Inventor: Robert Lehrer, Wilmington, Del.

[73] Assignee: Robert Lehrer Associates, Inc., Wilmington, Del.

[21] Appl. No.: 09/166,509

[22] Filed: Oct. 5, 1998

Related U.S. Patent Documents

Reissue of:

[64] Patent No.: 5,567,461
Issued: Oct. 22, 1996
Appl. No.: 08/239,581
Filed: May 9, 1994

[51] Int. Cl.[7] ..... A23D 9/00; A23D 1/015; B01D 39/00

[52] U.S. Cl. ..... 426/417; 426/433; 426/487; 426/488; 426/506; 210/501; 210/502.1; 210/777

[58] Field of Search ..... 426/79, 78, 77, 426/433, 417, 487, 488, 506; 210/346, 474, 486, 490, 502.1, 501, 777; 428/314.4

[56] References Cited

U.S. PATENT DOCUMENTS

| | | | |
|---|---|---|---|
| 2,716,607 | 8/1955 | Waline | 426/79 |
| 3,401,798 | 9/1968 | Nyrop . | |
| 3,494,468 | 2/1970 | Kohl . | |
| 3,607,297 | 9/1971 | Fasano | 426/433 |
| 3,664,095 | 5/1972 | Asker . | |
| 4,183,811 | 1/1980 | Walch . | |
| 4,535,497 | 8/1985 | Jacobsen | 8/156 |
| 4,579,658 | 4/1986 | Moller . | |
| 4,801,464 | 1/1989 | Hubbard, Jr. | 426/79 |
| 5,044,179 | 9/1991 | Jacobsen | 68/181 R |
| 5,068,115 | 11/1991 | Liebermann | 210/916 |

*Primary Examiner*—Anthony J. Weier
*Attorney, Agent, or Firm*—Connolly & Hutz

[57] ABSTRACT

A filter for fluids includes a pair of layers or multiple layers or pairs of material joined together to form a laminate having a fluid contacting surface. A plurality of spaced pockets is formed between the layers of material in the contacting surface. The layers of material are fluid permeable at the pockets whereby fluid may flow through the laminate at the pockets. The fluid contacting surface is fluid impermeable except for the pockets to require the fluid passing through the laminate to be confined to flowing through the pockets. Filter members are in the pockets for removing any contaminants from the fluid. Alternatively, additive materials such as powdered cream or sugar in the pockets dissolve in the fluid passing through the pockets to enhance the fluid.

14 Claims, 7 Drawing Sheets

METHOD OF TREATING FLUIDS WITH A FILTER

Matter enclosed in heavy brackets [ ] appears in the original patent but forms no part of this reissue specification; matter printed in italics indicates the additions made by reissue.

BACKGROUND OF THE INVENTION

The present invention relates to variations and aspects of the inventions in my application Ser. No. 08/019,709, filed Feb. 19, 1993, now U.S. Pat. No. 5,304,305, the details of which are incorporated herein by reference thereto.

Various beverages are made by flowing a fluid or liquid, such as hot water, through a beverage making substance, such as coffee grounds or tea. Other beverages or fluids are also mixed with water including food concentrates such as cocoa, baking or cooking mixes, juices, flavors, milk, soup, infant formula. It is known to hold the beverage making substance such as coffee grounds in a filter material when the water passes through the coffee grounds in making coffee. The known practices of utilizing a filter for holding the beverage making substances, however, does not provide for any removal of contaminants before or after the water reaches the beverage making substances. As a result, the contaminants can have adverse effects, such as causing a bitterness in the resultant beverage. Additionally, it would be desirable if contaminants could be removed from the liquid to help avoid the ingestion of extraneous substances which are potentially harmful to living species.

It would also be desirable if contaminants could be removed from other fluids such as in the regeneration of spent cooking or lubricating oils or if unwanted material could be removed from such fluids as milk, baby formula, wine and alcoholic beverages, as well as industrial fluids.

SUMMARY OF THE INVENTION

An object of this invention is to provide a filter which is intended to be used in the making of beverages wherein contaminants are removed from the fluid before or after the fluid contacts the beverage making substances.

A further object of this invention is to provide such a filter which is simple to manufacture and easy to use.

A yet further object of this invention is to provide such a filter which is intended to be used in removing contaminants from fluids prior to or during the time such fluids are used for any purpose whatsoever, for example, for removing contaminants from a wide variety of fluids ranging from human drinking substances to commercial fluids such as gasoline or spent cooking or lubricating oils.

A still further object of this invention is to provide such a filter which could be used with conventional beverage making equipment without requiring any modification of such equipment.

A still yet further application is to utilize the invention for adding substances to the fluid.

In accordance with one practice of this invention a fluid filter for removing contaminants from a fluid before the fluid contacts the beverage making substances comprises a pair of layers of material which are joined together to form a laminate. The laminate has a fluid contacting [surface] *region* with a plurality of spaced pockets between the layers in the fluid contacting [surface] *region*. The fluid contacting [surface] *region* is fluid impermeable except at the pockets so that the fluid passing through the laminate must pass only through the pockets. The pockets contain filter members which may be an absorbent or adsorbent material such as activated carbon, particularly activated charcoal, or silica or silicates (or derivatives or modifications thereof) or zeolites or chitin (including other derivatives of chitin such as chitosan) to clarify or decontaminate or regenerate or remove any contaminants from the fluid before or after the fluid reaches the beverage making substances.

The "filter members" may actually be additives, such as powdered cream or sugar, which dissolve in the fluid to enhance the fluid. Alternatively, the additive may, for example replenish an anti-oxidant where cooking oil or other similar substances are flowed through the pockets. In yet a further alternative, the pockets could contain filter members which remove substances from the fluid while also containing additives which dissolve in the fluid and become mixed with the fluid.

The fluid could be of the food or non-food type.

The pockets containing the filter members may extend toward the outer circumference to provide total filtration. The pockets may be in circular patterns to facilitate bending the filter to its proper size.

In a particular practice of this invention the filter is formed by having the laminate extend peripherally outwardly beyond the contacting [surface] *region* so that the outward peripheral extension could serve as mounting means when the filter is, for example, placed in a basket containing beverage making substances such as coffee grounds.

In a further practice of this invention a circular array of pockets containing filter members is provided outwardly beyond the generally flat fluid contacting [surface] *region* to permit some passage of fluid through the filter above the flat fluid contacting [surface] *region*.

In an alternative practice of the invention the fluid filter is mounted under the coffee grounds and functions during/after the fluid contacts the grounds.

In a further practice of this invention the laminate is of circular shape and terminated at the liquid contacting [surface] *region*. The filter is mounted in, for example, a basket by the use of a plurality of legs which extend from a liquid impervious member disposed between the laminate layers. The liquid impervious member would have holes located at each of the pockets to permit the filter members to be located in the pockets and to permit the flow of liquid thereto.

In a further practice of this invention one layer of the laminate would terminate at the contacting surface while the other layer would extend outwardly beyond the contacting [surface] *region* to the end of the legs of the liquid impervious intermediate member.

THE DRAWINGS

DETAILED DESCRIPTION

The present invention will be described in particular detail in accordance with an illustrated practice where the filter is used for making coffee. Thus, the fluid is a liquid, specifically hot water. It is to be understood, however, that the invention may be practiced with other fluids ranging from those used for making beverages or drinks for human consumption to any other contaminant containing fluid such as gasoline, kerosene, spent lubricating or cooking oils and other fluids which are not ingested by humans or animals. In such practices specific filter members would be selected in accordance with the contaminant being removed.

Figure 1:
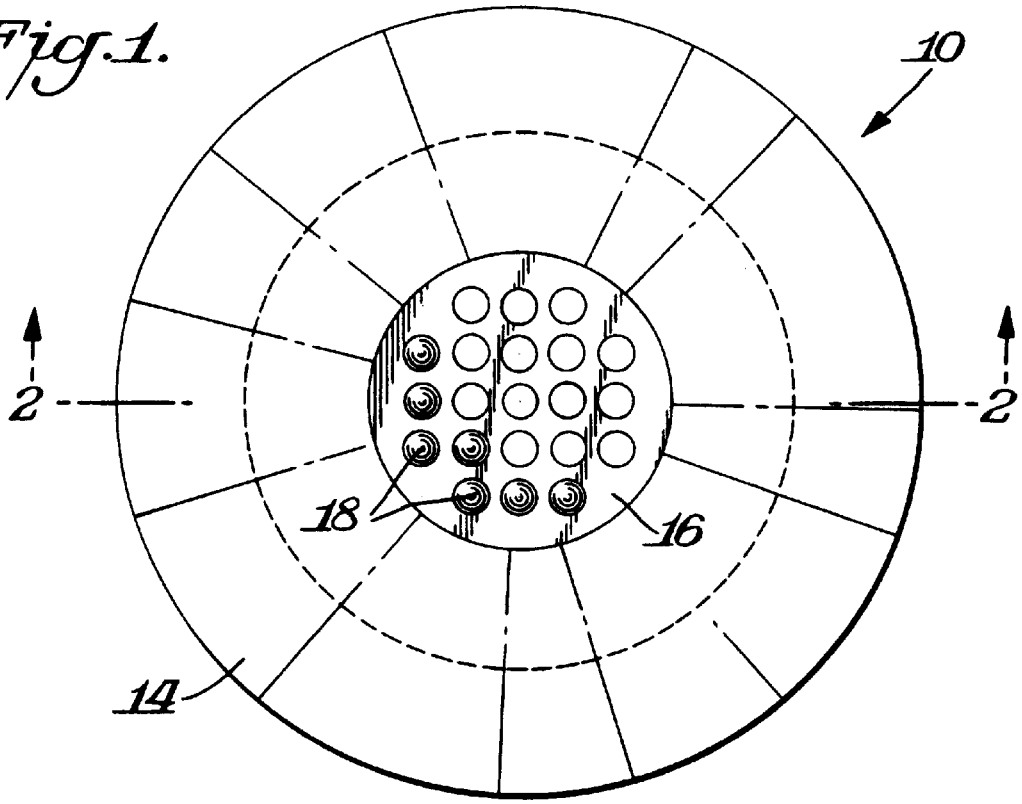
FIG. 1 is a top plan view of a filter member in accordance with one embodiment of this invention.
Figure 2:
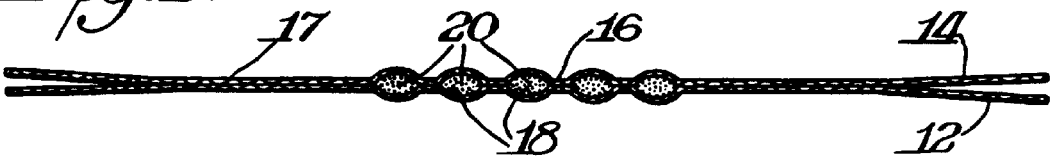
FIG. 2 is a cross-sectional view taken through FIG. 1 along the line 2—2.
Figure 3:
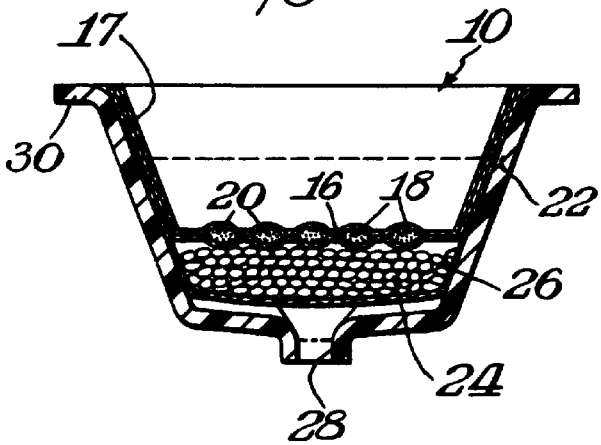
FIG. 3 is a cross-sectional view in elevation showing the filter of FIGS. 1–2 mounted in a basket containing beverage making substances.

FIGS. 1–3 illustrate a fluid filter 10 in accordance with this invention for making coffee. As shown therein fluid filter 10 is in the form of a pair of layers of material 12,14 which are laminated together in at least their central portion to form a *fluid contacting region or area 16 having an upstream* fluid contacting surface [16]. A plurality of pockets with circular or other geometric shape in the form of a grid 18 is formed at spaced locations in the fluid contacting [surface] *region*. The pockets 18 are filled with one or more filter members or media 20 such as activated carbon, particularly in charcoal form. Media 20 acts as absorbent or adsorbent or ion-exchange material. Layers 12,14 are made of a filter type material which would permit the flow of fluid through the material. The fluid contacting [surface] *region*, however, has a coating or intermediate film (such as thermoplastic or thermosetting resin) throughout except where pockets 18 are located to render the composite formed by layers 12 and 14 fluid impermeable over the fluid contacting [surface] *region* 16 except for the location of pockets 18. The coating also provides a degree of stiffness to the fluid contacting area 16 which is useful in properly locating the fluid contacting area 16 in a basket as later described. If desired layers 14 and [16] *12* may be secured together throughout their surface area or the layers may be separate from each other as illustrated in FIG. 2 in the peripheral portion of the laminate which extends outwardly beyond the fluid contacting [surface] *region* 16. The outwardly extending peripheral portion functions as mounting means when filter 10 is in use.

FIG. 3 shows filter 10 mounted in a conventional basket 22 such as used for making coffee. As shown therein coffee grounds 24 are placed in a conventional coffee filter 26 at the bottom of the basket 22. A spout 28 is provided centrally in basket 22 to permit water passing through the coffee grounds to flow into a coffee dispenser. Basket 22 includes conventional flanges 30 or other means for mounting the basket 22 in a dispenser, such as a coffee pot.

As shown in FIG. 3 filter 10 is placed in basket 22 above coffee grounds 24. The stiffened central fluid contacting surface 16 is dimensioned to generally extend to the edge of basket 22 with the annular extension 17 of the laminate resting on the inner surface of coffee filter 26. The filter 10 is dimensioned so that the filter terminates coterminous with the upper edge of basket 22.

In use, water would be placed in filter 10 and would be forced to flow through pockets 18 because the remainder of filter contacting [surface] *region* 16 is fluid (water) impermeable. By confining the flow of water through pockets 18 any contaminants from the water would be removed by the adsorbent or absorbent or ion-exchange filter members 20. Thus, the water reaching the coffee grounds 24 would be prepurified so that the resulting coffee would not have a bitterness to its taste and the ingestion of extraneous substances which are potentially harmful would be avoided.

As indicated, the preferred filter material 20 comprises one or more absorbent or adsorbent or ion-exchange materials, or other materials having separation capability regardless of how the separation occurs. A particularly advantageous filter material is activated carbon and more particularly activated charcoal. The activated charcoal may be used alone or in combination with one or more other adsorptive or absorptive or sieving or reactive or sequestering or otherwise tenacious materials. Suitable materials would be activated silica, silicates, zeolite and chitin or derivatives or modifications of these materials. The filter material should be resistant to heat or hot water and not affect the resultant beverage. Layers 12,14 may be sheets of filter paper or other similarly functional porous material, such as teabag material, cloth or synthetic or natural polymeric materials. Filter 10 should be of a size, shape and composition to be useful in the flow path of fluids, particularly water, at ambient or elevated temperature, to remove undesirable naturally containing or deliberately added physical or chemical contaminants before the fluid is used in extraction from beverage producing substances. The particular materials would be selected to withstand temperature and other environmental conditions encountered in their particular end use.

The filter 10 may be a single use product, although it is within the scope of this invention for filter 10 to be reusable. Use of filter 10 would be accomplished in conjunction, for example, with commonly found brewing appliances in which cold water is heated and flows by gravity through the bed of particulate coffee or tea to a receiving vessel. The invention, however, may be practiced for filtering liquids, not necessarily water in the making of other beverages such as hot chocolate, juices, etc. where the liquid is at an elevated temperature or at room temperature or at a chilled temperature, and for the clarification, regeneration or decontamination of fluids such as lubricating oils, cooking oil and wines.

Figure 4:
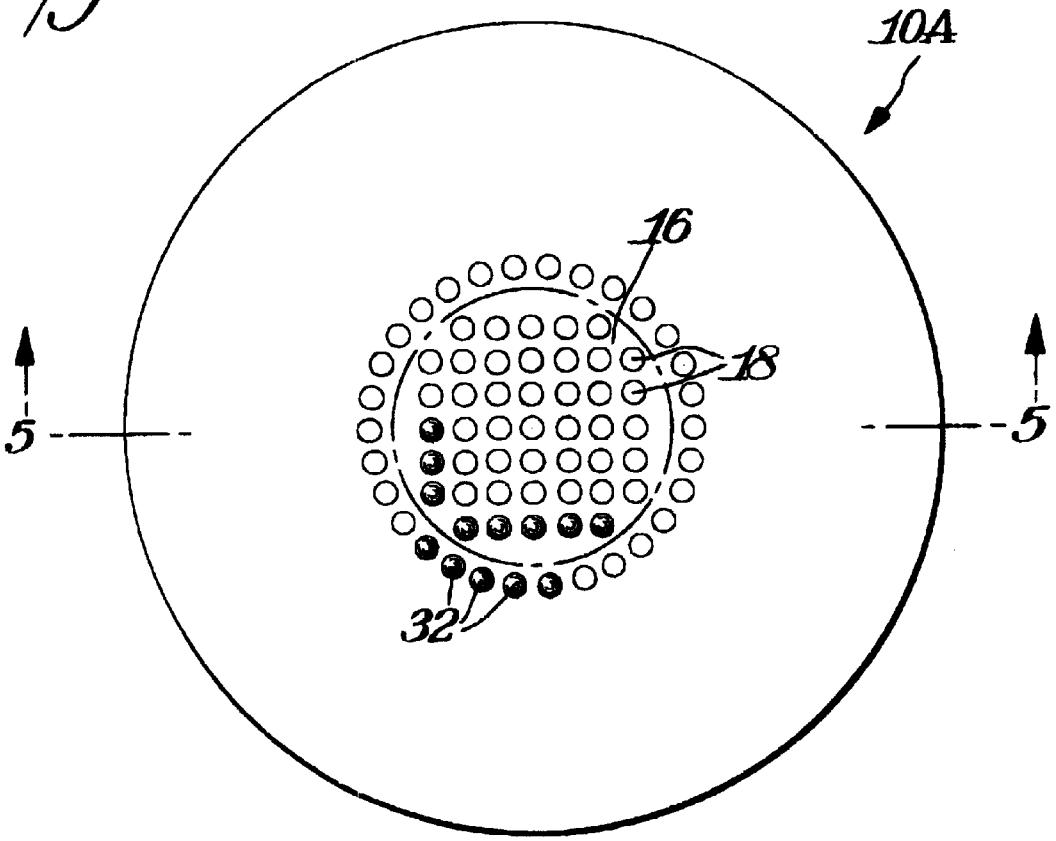
FIG. 4 is a top plan view of a beverage filter in accordance with a further embodiment of this invention.
Figure 5:
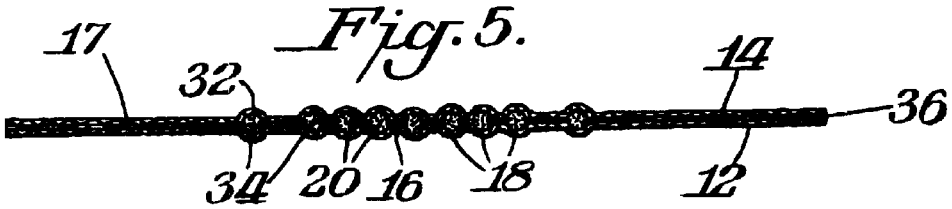
FIG. 5 is a cross-sectional view taken through FIG. 4 along the line 5—5.
Figure 6:
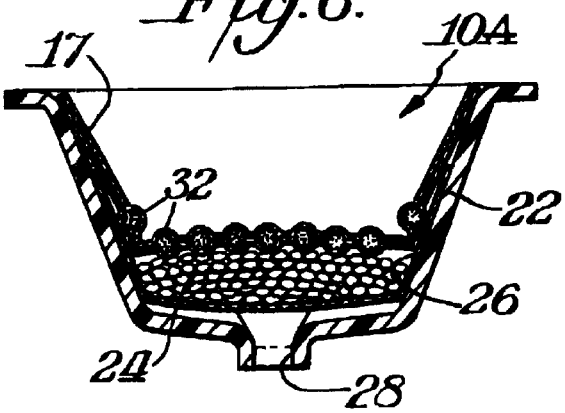
FIG. 6 is a cross-sectional view in elevation showing the filter of FIGS. 4–5 mounted in a basket.

FIGS. 4–6 illustrate a variation of filter wherein the filter 10A is generally along the same lines of construction as filter 10. The differences, however, are in the provision of a circular array of pockets 32 having filter material 34 in the annular extension 17 of filter 10A. In this embodiment an intermediate layer 36 is mounted between inner and outer layers 12,14. Layer 36 may be of any suitable material, such as polyethylene, which would be used to hold the filter paper layers 12,14 together. Layer 36 would have holes at each of the pockets to permit the filter material 20,34 to be placed in the pockets 18,32. In this embodiment it is preferred that the various layers be laminated together throughout their surface. Additionally, the filter 10A should be fluid impervious (except for pockets 32) beyond the central fluid contacting surface 16. This may be conveniently accomplished by having intermediate layer 36 made of a fluid impermeable material.

A further difference between filters 10 and 10A is in the greater density of filter pockets 18 in the central fluid contacting [surface] *region* 16 for filter 10A as compared with filter 10. The provision of the additional filter pockets 32 permits fluid to pass through filter 10A at a higher elevation than simply though the fluid contacting [surface] *region* 16. This in conjunction with the greater density of filter pockets permits the fluid to pass at a faster rate into contact with the beverage making substances 24. Where the fluid contacting [surface] *region* 16 its slightly spaced from the inner surface of basket 22 the filter does not create a seal against basket 22 and fluid is thereby permitted to flow through pockets 32 and down the sides of brewing basket 22.

Figure 7:
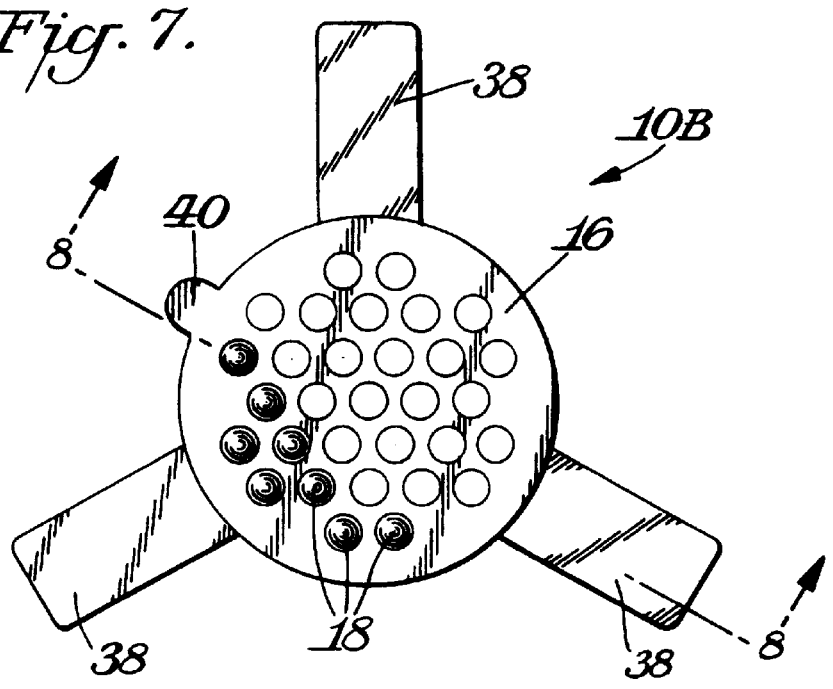
FIG. 7 is a plan view of yet another beverage filter in accordance with this invention.
Figure 8:
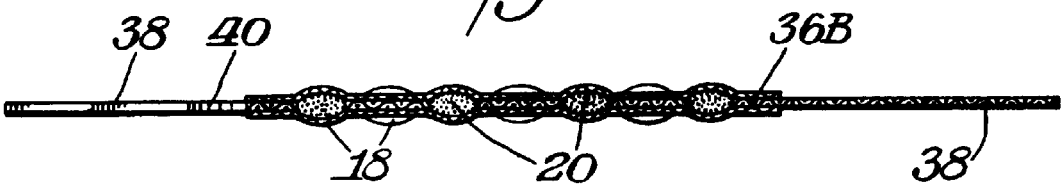
FIG. 8 is a cross-sectional view taken through FIG. 7 along the line 8—8.
Figure 9:
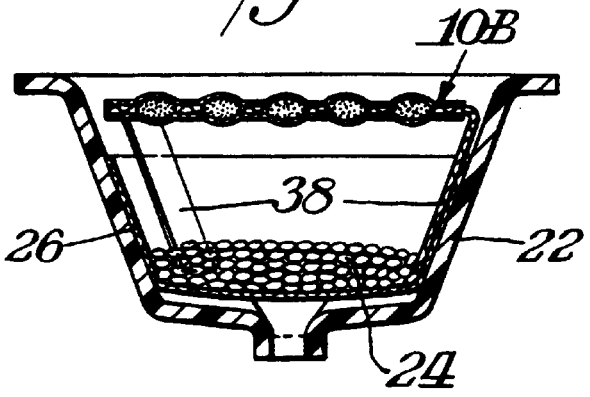
FIG. 9 is a cross-sectional view in elevation showing the filter of FIG. 7–8 mounted in a basket.

FIGS. 7–9 illustrate yet a further filter 10B in accordance with this invention. As shown therein the laminate is confined to the central fluid contacting [surface] *region* 16. The intermediate layer 36B is in the form of a disk having the same size as the laminate but having a plurality of outwardly extending legs 38. Additionally a tab 40 extends beyond the periphery of the laminate. Legs 38 function to mount fluid contacting [surface] *region* 16 in brewing basket 22 elevated above beverage making substances 24. This would be preferred where it is desired to assure that the pockets 18 with the filter material 20 should be maintained out of contact with the substance 24.

FIG. 9 illustrates the peripheral edge of fluid contacting [surface] *region* 16 to be slightly spaced inwardly from the inner surface of brewing basket 22. The amount of non-filtered fluid escaping through the filter above *the fluid contacting* surface [16] does not significantly affect the effectiveness of the filter. If desired, however, the fluid contacting [surface] *region* 16 could extend to the edge of brewing basket 22 so that fluid could not fall directly into contact with the beverage making substance 24 without passing through pockets 18. In addition, an upstanding peripheral wall inclined at the same angle as the inner surface of brewing basket 22 could be provided around fluid contacting [surface] *region* 16 to create a dam for further assuring that the fluid will pass only through the pockets 18.

In use tab 40 would be bent upwardly in a direction opposite the downward bend of legs 38 to provide a convenient means for grasping filter 10B when it is desired to remove filter 10B from brewing basket 22.

Figure 10:
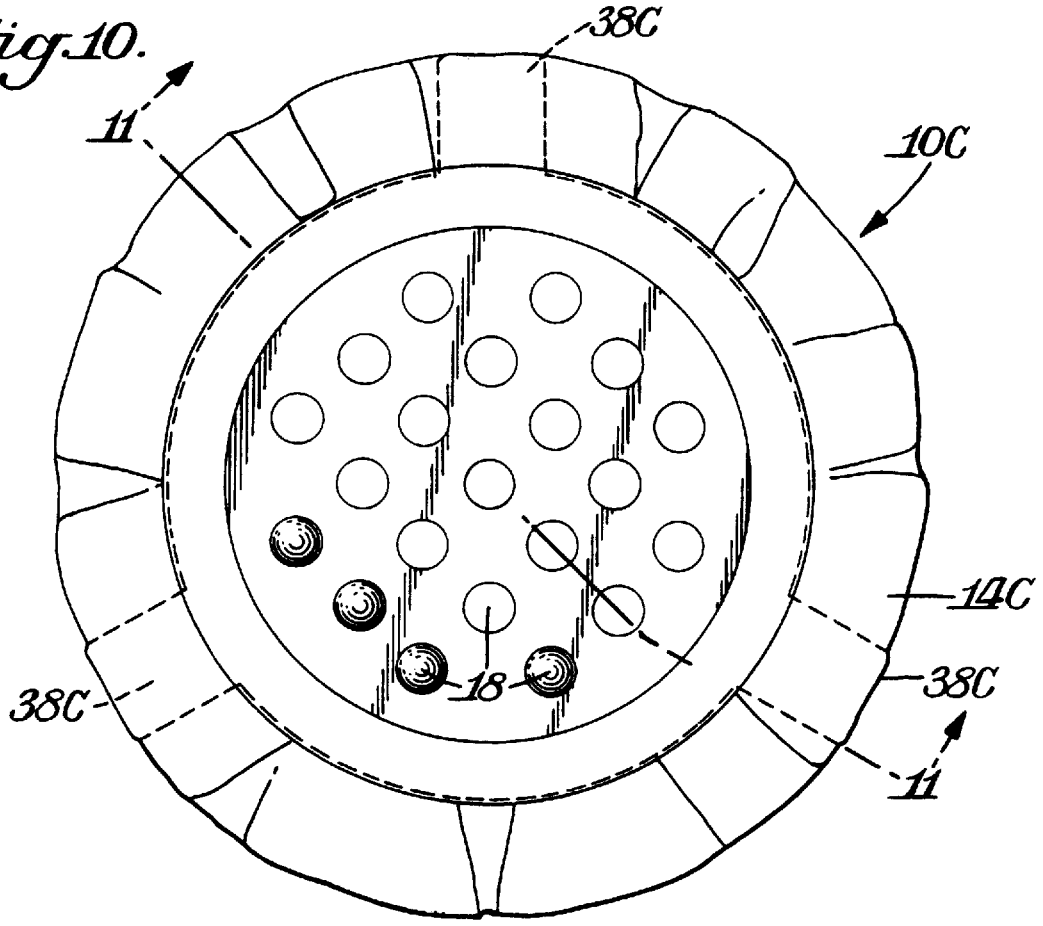
FIG. 10 is a plan view of still yet another filter in accordance with this invention.
Figure 11:
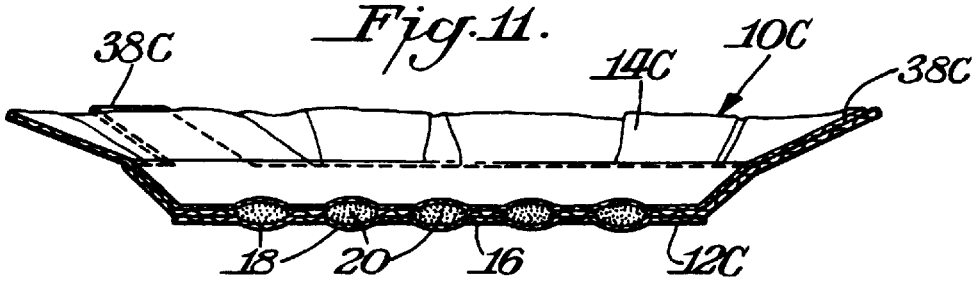
FIG. 11 is a cross-sectional view taken through FIG. 10 along the line 11—11.
Figure 12:
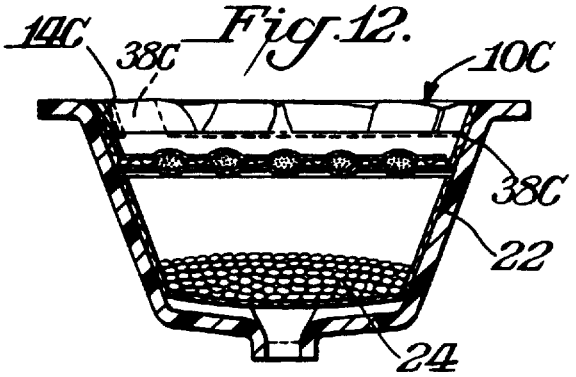
FIG. 12 is a cross-sectional view in elevation showing the filter of FIGS. 10–11 mounted in a basket.

FIGS. 10–12 illustrate yet another filter 10C in accordance with this invention. As shown therein lower layer 12C terminates at periphery of fluid contacting [surface] *region* 16 while upper layer 14C extends beyond fluid contacting [surface] *region* 16 and ends coterminous with the ends of legs 38C. In this practice of the invention, as shown in FIG. 12, filter 10C could be elevated from beverage making substances 24 by bending legs 38C upwardly so that the legs 38C rest against the upper portion of brewing basket 22. Since the legs and filter material, namely layer 14C, would be accessible from the top of brewing basket 22 a tab, such as tab 40, is not necessary.

The various filters may be formed in any suitable dimensions and of any suitable materials capable of meeting the criteria of this invention. For example, the material of layers 12,14 should be strong enough to hold the filter material 20. The material must, however, be porous where the pockets are located so that fluid or liquid such as hot water could pass through the laminate. In a preferred practice of the invention the layers 12,14 are made of filter paper which is from 5 to 40 mils in thickness and preferably 10 to 20 mils thick, coated with from 0.5 to 6 mils of a thermoplastic. The thermoplastic should have a melting point above the boiling point of water and below where the paper will degrade upon applying heat and pressure. The preferred structure is paper about 14 mils thick coated on both sides with about 0.5 mils of polyethylene. One-half mil of thermo-plastic should be adequate for adhesion upon applying heat and pressure and it is about the thinnest layer that can be applied without discontinuity problems. The filter should have a diameter of 3 to 5 inches for home use and up to 18 inches for use in commercial establishments. The activated carbon or charcoal would have a surface area of 50 to 2500 square meters per gram. Generally, the laminate would have from 5 to 50 pockets containing the filter material 20.

The central fluid contacting surface *of region* 16 may, for example, have a diameter of 2.56 inches. Pockets 32 of filter 10A are preferably arranged in a circular array having a diameter of 3 inches. It is to be understood, however, that the pockets 32 need not be coarctate with each other, but could be staggered or even randomly arranged to provide the added ability of permitting a faster rate of water or other fluid to be filtered.

Figure 13:
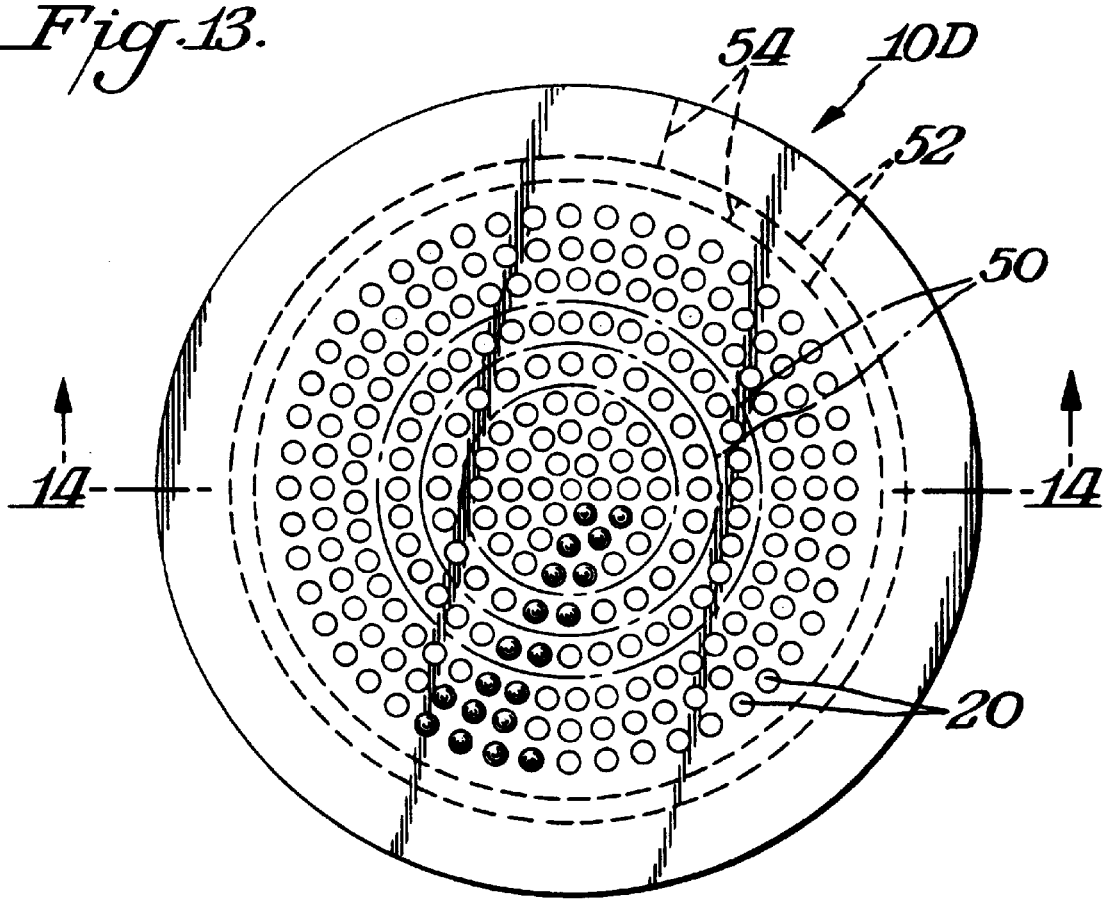
FIG. 13 is a plan view of yet a further filter in accordance with this invention.
Figure 14:
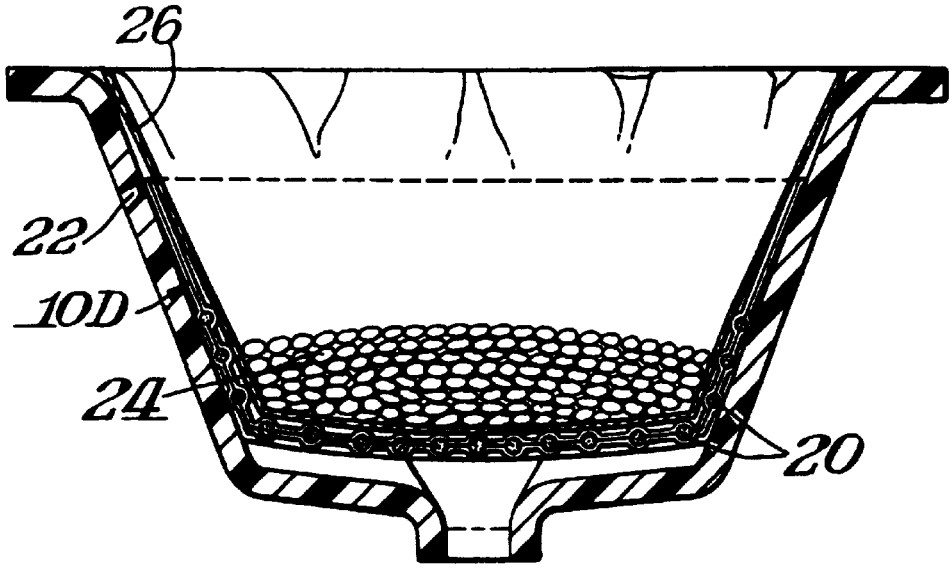
FIG. 14 is a cross-sectional view taken through FIG. 14—14 of FIG. 13 with the filter mounted in a basket.

FIGS. 13–14 illustrate yet another embodiment of this invention wherein the fluid filter 10D is of the same general construction as filters 10 and 10A in that the filter is of circular shape. As shown in FIG. 13, however, the fluid contacting [surface] *region* 16 includes a large plurality of pockets 20 which are arranged in concentric circles to maximize the flow of fluid through fluid contact [surface] *region* 16. In the illustrated embodiment there are eight rows of pockets concentrically arranged around the center most pocket. Where each pocket is, for example, 0.28 inches in diameter and where the liquid contact surface *of region* 16 is 6.5 inches in diameter, then the area of flow for the 238 pockets would comprise about 50% of the liquid contact surface area. Additionally there would be about 7.2 pockets per square inch.

A particularly advantageous feature of having the concentrically arranged pockets is that concentric fold lines 50 could be provided between the adjacent rows of pockets so that the horizontal portion of the fluid contact surface 16 could be adjusted in diameter by bending at an appropriate fold line to accommodate the particular size basket or other article into which the filter 10D is inserted. Similar adjustments in the overall size of filter 10D can also be achieved by providing weakened or perforated concentric lines 52 and if desired radial perforated lines 54 joining the concentric perforated lines 52 so that the size of filter 10D can be reduced by tearing at the appropriate perforated line 52 to accommodate the particular basket or other container into which filter 10D is inserted. The radial perforated lines 54 are provided to facilitate access to the arcuate perforated lines 52.

FIG. 14 shows a further variation in the use of a filter such as filter 10D wherein the filter 10D is mounted below the coffee filter 26. This exemplifies the practice of the invention which may be used with other variations of the fluid filter wherein the filtering by the fluid filter would take place after the fluids passes through the coffee grounds 24 or other substances. In this practice the added filter 26 is provided for initial filtering. Such other filter, however, may be omitted.

It is therefore to be understood that the invention may be practiced for filtering a fluid either before or after the fluid flows through a substance such as a beverage making substance. It may also be practiced for decontaminating fluids initially and for purposes of regeneration.

The invention is particularly advantageous in that it provides for the removal of organic and other contaminants such as metals in water after, for example, heating the water in a heating chamber of a brewing appliance. Advantageously the removal takes place either before or after the water contacts the bed of coffee, tea or other concentrate or beverage making substance. This serves to enhance the flavor of the resultant extract or mixture and helps avoid ingestion of such contaminants in the water by removing the contaminants before or after the contaminants reach the beverage making substances. Where the invention is used for specific uses having known contaminants filter materials can be selected which are particularly effective with those specific contaminants. The filter made in accordance with this invention can be easily produced in an economical manner and can be easily used in a conventional brewing basket or other suitable carrier device.

Figure 15:
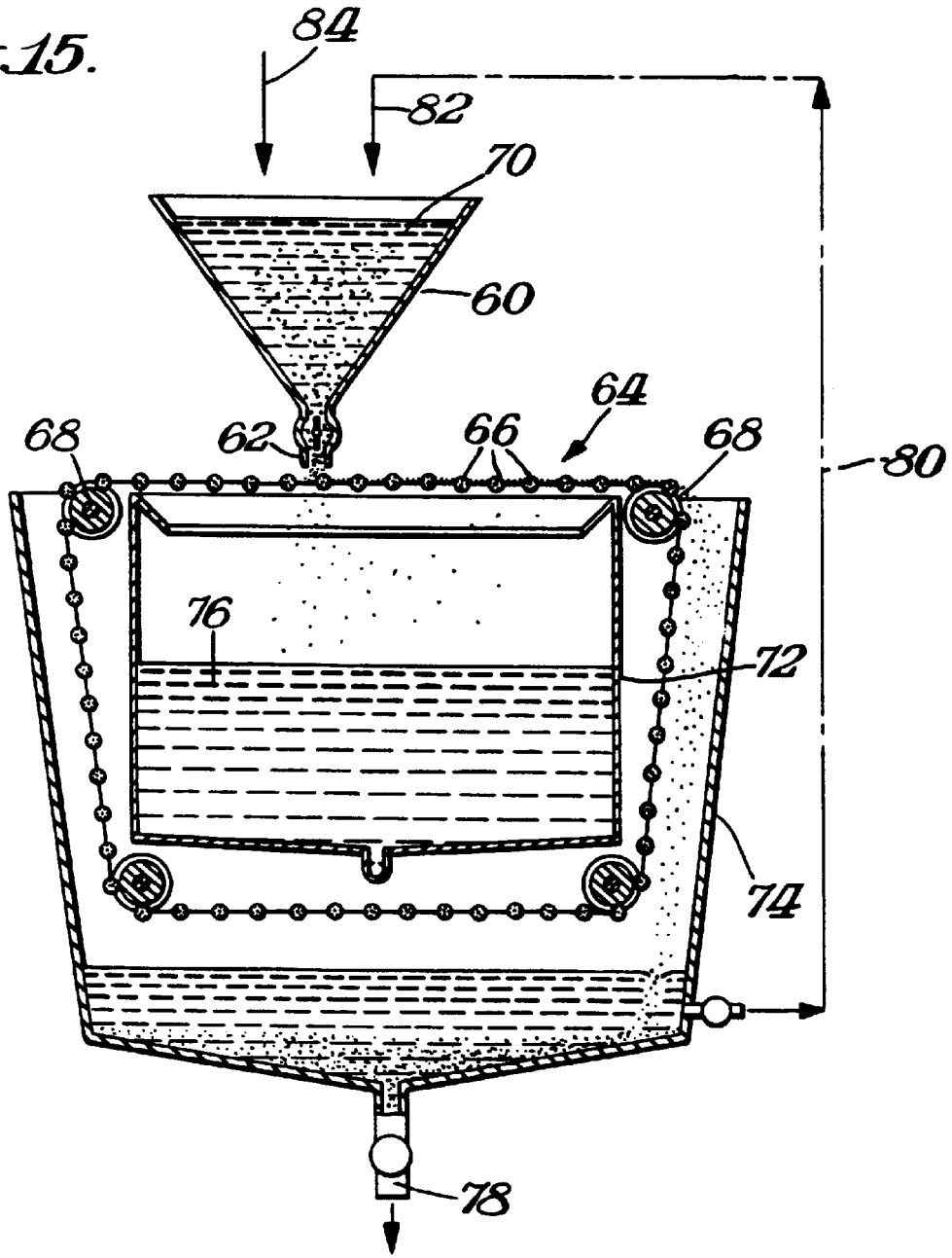
FIG. 15 is a cross-sectional view in elevation showing use of the invention for removing contaminants from spent cooking or lubricating oils.

FIG. 15 exemplifies the use of the invention to make clear that the invention may be practiced for removing contaminants or otherwise clarifying various types of materials and not simply for filtering beverages, such as coffee. As shown in FIG. 15 the invention is used in connection with the regeneration or clarification of spent cooking or lubricating oils. A feed hopper 60 would be provided into which the oils would be fed and then discharged through a dispensing outlet 62 toward a filter 64. The filter 64 is made in accordance with the various previously described embodiments wherein a plurality of pockets 66 would be formed in the filter material. In the illustrated embodiment of FIG. 15 the filter is made in the form of an endless belt of any suitable width mounted about spaced rollers 68 and movable beneath the dispensing spout 62 so that the oil 70 being discharged through spout 62 would be forced to contact filter 64 before passing into collection container 72. Collection container 72 and filter 64 as well as the roller 68 may be mounted within overflow collector 74. Overflow collector 74 thus receives any excess unfiltered oil falling from filter belt 64 as shown in the upper right hand portion of discharge collector 74. The clarified oil 76 is collected in the beam of collection chamber 72. The unclarified oil falls to the bottom of overflow collector 74. Collector 74 may contain a discharge spout 78 for removing heavier contaminants which would sink to the bottom of collector 74. If desired, the untreated oil may be conveyed through recirculating line 80 back into feed hopper 60 as indicated by the arrow 82. Arrow 84 indicates the feed of fresh oil into feed hopper 60.

It is to be understood that the system shown in FIG. 15 is merely for exemplary purposes to make clear that the invention may be broadly practiced for treating a wide range of different materials wherein the specific filter media would be selected in accordance with the type of contaminant to be removed. Thus, for example, with spent cooking or lubricating oil a filter material, such as silica would be more preferred than, for example, charcoal. Other filter media would be selected in accordance with the fluid being treated. Similarly, various other arrangements could be used for disposing the filter into contact with the fluid. What is important, however, is that the filter contain a fluid impervious surface with fluid previous pockets which contain the filter media so that the fluid being treated is forced to flow through the pockets and thus be subjected to the action of the filter media. It is also to be understood that although the invention in its preferred practice utilizes a fluid contacting surface which is horizontal the fluid contacting surface may be disposed at an angle so that the fluid flows down the surface while portions of the fluid pass through the pockets in the filter.

Figure 16:
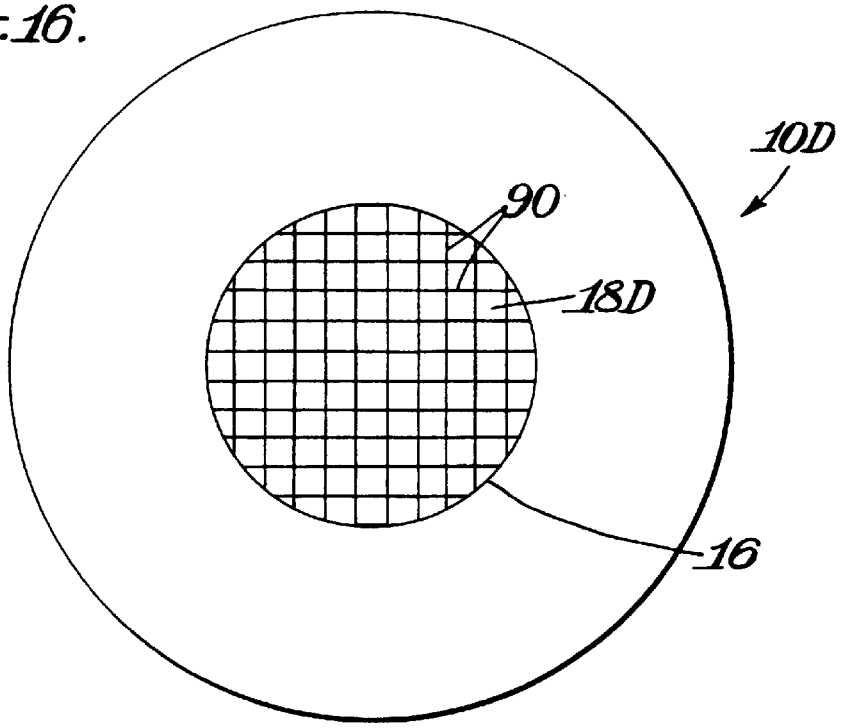
FIGS. 16–17 are plan views of alternative forms of filter structure in accordance with this invention.
Figure 17:
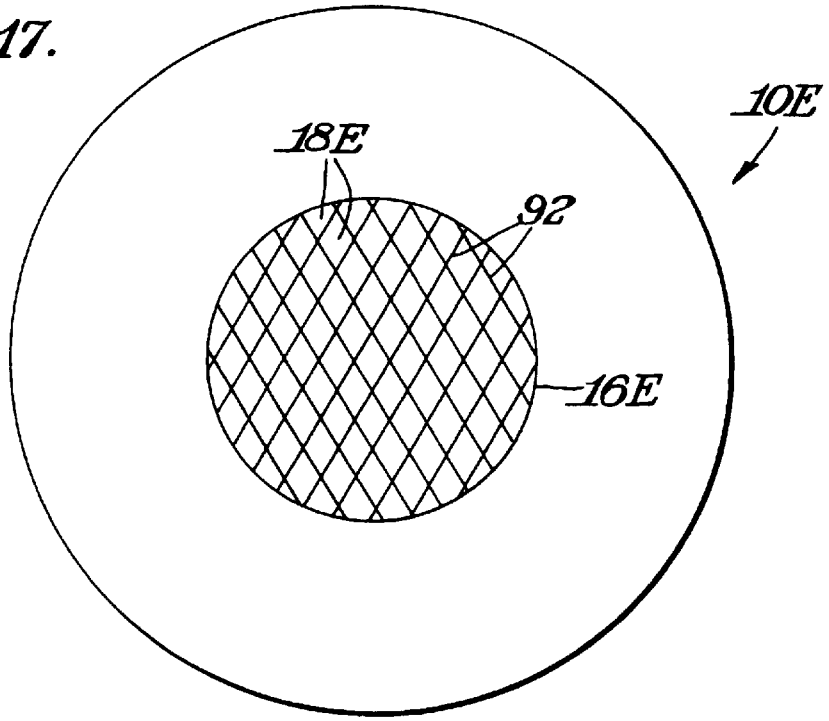

The various figures illustrate the pockets holding the filter media to be spaced from each other. It is to be understood that in order to maximize the filter action the pockets may be formed in the fluid contacting surface to be as close as practical to each other. FIG. 16, for example, illustrates a filter 10D having a fluid contacting [surface 16D] *region 16*. The fluid contacting [surface] *region* is in grid form wherein the layers of the filter are joined together along narrow lines 90 by heat sealing or any other suitable manner. As a result, a plurality of pockets 18D is formed between the grid lines 90. Each pocket 18D would hold filter media. By this arrangement substantially the entire area of fluid contacting [surface 16D] *region 16* includes filter media in the plurality of pockets 18D.

Although FIG. 16 illustrates the grid which forms the filter media containing pockets to have perpendicular grid lines forming square type pockets, it is to be understood that the pockets may be of any geometric shape including individual pockets having shapes which differ from each other. What would control the shape of each pocket would be the grid lines. Thus, FIG. 16 exemplifies a filter 10E having a fluid contacting surface 16E with grid lines 92 forming diamond shaped pockets 1BE. The illustration of diamond shaped pockets is merely to exemplify one of the possible shapes of the pockets other than being circular as, for example, in FIG. 1 or square as, for example, in FIG. 16.

Figure 18:
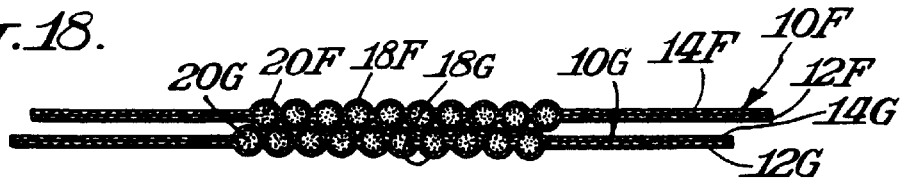
FIG. 18 is a cross-sectional view in elevation of still yet another form of filter structure in accordance with this invention.

FIG 18 illustrates a further variation of the invention wherein a composite filter comprises a pair of filter 10F and 10G which could be any of the forms previously described. FIG. 18 is included herein to exemplify how a multi-layering of filter media could be achieved. In the illustrated form the pockets 18F and 18G are arranged in a staggered fashion. The pockets, however, could be super-imposed above each other or could be in any other arrangement. This variation particularly lends itself to pockets formed from grid lines. The arrangement of FIG. 18 also makes it possible to readily use different types of filter media 20F and 20G in individual pockets. It is to be understood that although two sets of filters are illustrated in FIG. 18 any multiple number of sets may be used. It is also to be understood that although FIG. 18 illustrates each filter 10F and 10G to comprise a separate set of two layers 12F, 14F and 12G, 14G it is possible to omit one of the intermediate layers. Thus, for example, layer 12G may serve as the bottom layer for the filter media 20G and layer 14F may serve as the top layer for filter media 14F with a single layer being between layers 12G and 14F to separate the pockets 18F and 18G.

The invention may also be practiced by having the pockets contain additives such as powdered cream or sugar, which dissolve in the fluid passing through the pockets. The fluid is thus enhanced by being sweetened or lightened by the dissolved cream. The invention could thus be practiced to add cream or sugar to coffee or tea. Other or the same powdered materials could also be added to other fluids such as the fluid referred to in the background portion of this specification to enhance the fluid by altering its taste or enriching the fluid to include, for example, vitamins.

The pockets may also contain materials used for replenishing the fluid. Thus, for example, where the fluid is cooking oil the pockets could contain anti-oxidant for replenishing the anti-oxidant previously lost during use of the cooking oil.

The invention may be practiced by combining in the pocket some materials which have removal or filtering characteristics with other materials having additive characteristics. In such use of the invention the pockets could be used for its filtering properties while simultaneously enhancing the fluid by some form of dissolvable additive.

In general, the pocket would contain materials which function for solid phase extraction or to recover substances from the fluids for other purposes. For example, the invention could be used to remove substances from a fluid when it is desired to analyze the substances. This practice of the invention would lend itself to use in investigations for determining if unintended substances, such as poisons, had been in a fluid.

While the invention has been described with particular use of paper or plastics. Other materials may be used for forming the treating member. A particularly suitable material is sintered metal such as aluminum or stainless steel. The use of metal would permit the treating material to be used for fluids which otherwise could not be used for papers or plastics. Such fluids might, for example, contain acids or cooking oils which are not adaptable for use with paper or plastic.

It is also to be understood that the invention may be practiced where the treating member is of non-circular shape such as a square, rectangle or any other desired shape. Additionally, while the invention has been described with respect to the advantage of being disposable it is to be understood that the invention could be practiced where the treating member may be used multiple times. In particular, where the treating member is made of sintered metal it is also possible to practice the invention by separating the layers for exposure to the pockets so that the materials in the pockets could be replenished.

It is to be understood that various features described with any one particular embodiment of this invention may be utilized with other embodiments.

What is claimed is:

1. A process for incorporating an additive in a fluid for enhancing the fluid comprising the steps of providing a fluid treating member in the form of upstream and downstream layers of material joined together to form a laminate having a fluid contacting [surface] *region* with a plurality of spaced pockets between the layers of the material in the fluid contacting [surface] *region* and with the layers of material being fluid permeable at the pockets and with the upstream layer being liquid impermeable except at the pockets, mounting the treating member in a fluid applicating station, the permeability and impermeability characteristics of the upstream layer being inherent characteristics of the material used for the upstream layer whereby the permeability portions are self-permeable without requiring any piercing and alterations of the upstream layer to create fluid permeability, the upstream layer having its permeability and impermeability characteristics prior to mounting the treating member in the fluid applications station with the characteristics remaining unchanged both before and after the treating member is mounted in the fluid applicating station, the permeability and impermeability characteristics requiring the fluid to pass through the laminate by being confined to flowing through the pockets and with dissolvable additive material in the pockets dissolving in response to the fluid passing through the members, mounting the treating member in the path of fluid flow at a location spaced upstream from the collection area of the path of flow, directing the fluid against the upstream layer of the fluid contacting [surface] *region*, flowing a portion of the fluid laterally at the liquid impermeable portion of the upstream layer, flowing the fluid through the pockets of the treating member, dissolving the additive material by the action of the fluid contacting the additive material in the pockets, and incorporating the dissolved material in the fluid which passes out of the pockets and through the treating member and then flows to the collection area.

2. The process of claim 1 wherein the fluid is coffee and the additive material is powdered cream or sugar.

3. The process of claim 1 wherein the additive is selected from the group consisting of cocoa, baking mix, cooking mix, juice, flavors, milk, soup, infant formula, coffee, tea, wine, and hot chocolate.

4. The process of claim 1 wherein the additive material is selected from the group consisting of powdered cream, sugar and vitamins.

5. The process of claim 1 wherein the fluid is a cooking oil and the additive material is an anti-oxidant.

6. The process of claim 1 wherein the fluid is a nonfood substance.

7. The process of claim 1 wherein the fluid contacting [surface] *region* is of shape retaining form, and maintaining the fluid contacting [surface] *region* generally horizontal when the member is mounted in the collection area.

8. The process of claim 1 wherein the fluid contacting [surface] *region* is of circular shape with the pockets being arranged in a plurality of concentric circles and with a plurality of bend lines between adjacent sets of the concentric circles, and bending the member to conform to the shape of a mounting member above the collection area.

9. The process of claim 1 including also providing filter material in pockets in the member, and removing undesired substances from the fluid by the filter material contacting the fluid while the additive material is being dissolved.

10. The process of claim 9 including providing the filter material and the additive material in the same pockets.

11. A process for treating a fluid for enhancing the fluid comprising the steps of providing a fluid treating member in the form of upstream and downstream layers of material joined together to form a laminate having a fluid contacting [surface] *region* with a plurality of spaced pockets between the layers of material in the fluid contacting [surface] *region* and with the layers of material being fluid permeable at the pockets and with the upstream layer being liquid impermeable except at the pockets, mounting the treating member in a fluid applicating station, the permeability and impermeability characteristics of the upstream layer being inherent characteristics of the material used for the upstream layer whereby the permeability portions are self-permeable without requiring any piercing and alterations of the upstream layer to create fluid permeability, the upstream layer having is permeability and impermeability characteristics prior to mounting the treating member in the fluid applicating station with the characteristics remaining unchanged both before and after the treating member is mounted in the fluid applicating station, the permeability and impermeability characteristics requiring the fluid to pass through the laminate by being confined to flowing through the pockets and with treating material in the pockets, mounting the treating member in the path of fluid flow at a location spaced upstream from the collection area of the path of flow, directing the fluid against the upstream layer of the fluid contacting [surface] *region*, flowing a portion of the fluid laterally at the liquid impermeable portion of the upstream layer, flowing the fluid through the pockets with the fluid contacting the treating material in the pockets, reacting the fluid with the treating material before the fluid passes completely through the pockets, and collecting the treat fluid which passes out of the pockets and flows to the collection area.

12. The process of claim 10 wherein the treating material is an additive material which is dissolved upon contact by the fluid to enhance to fluid by the additive material being dissolved in the fluid.

13. The process of claim 12 wherein the treating material further includes filter material which enhances the fluid by removing undesired substances from the fluid whereby fluid which is both filtered and has an additive dissolved therein is collected in the collection area.

14. The process of claim 11 wherein the treating material is filter material which enhances the fluid by removing undesired substances from the fluid.

* * * * *